Nov. 16, 1937.  T. S. QUEA  2,099,430
CAN OPENER
Filed Oct. 17, 1936
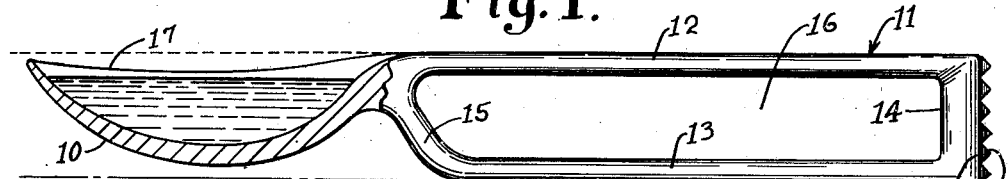
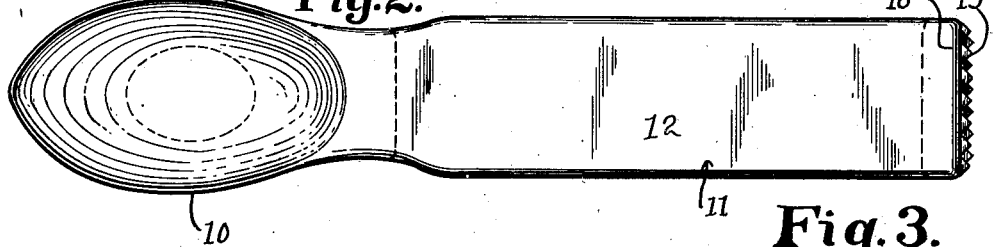
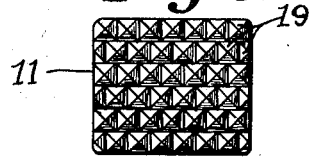
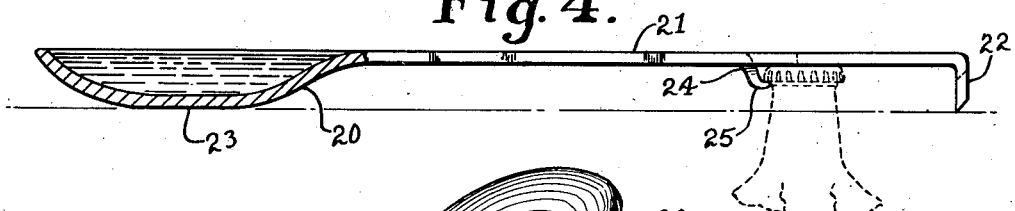
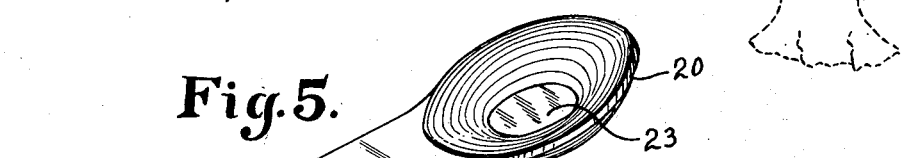
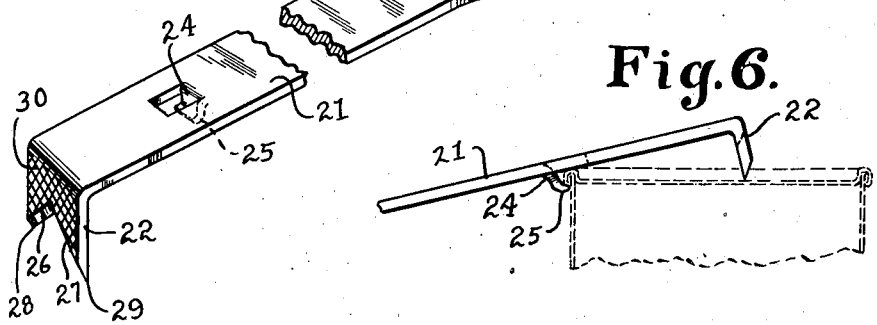
INVENTOR
*Thomas S. Quea.*
BY *H. G. Manning*
ATTORNEY Patented Nov. 16, 1937

2,099,430

UNITED STATES PATENT OFFICE 2,099,430

CAN OPENER

Thomas S. Quea, Watertown, Conn.

Application October 17, 1936, Serial No. 106,137

1 Claim. (Cl. 30—16)

This invention relates to culinary implements, and more particularly to a spoon that may be used to measure and serve a definite quantity of a liquid or powder.

One object of this invention is to provide a spoon of the above nature having a relatively heavy handle of such a construction that when the spoon is placed upon a horizontal surface, the bowl of the spoon will be held in an elevated position above said surface even when filled with a liquid or powder.

A further object is to provide a novel form of spoon handle made in the shape of a rectangular loop and having an elongated slot for receiving the fingers of the user.

A further object is to provide a spoon of the above nature having a section which may be used to crush ice or citrous fruits, mix drinks, remove caps from bottles, open tin cans, and which may be hung on the rim of a glass or elsewhere when not in use.

A still further object is to provide a spoon of the above nature which will be simple in construction, easy to manipulate, compact, ornamental in appearance, and very efficient and durable in use.

With these and other objects in view, there have been illustrated on the accompanying drawing two forms in which the invention may be conveniently embodied in practice.

In the drawing:

Fig. 1 represents a side view, partly in section, of the preferred form of spoon provided with a raised bowl, said spoon being shown resting upon a table and filled with a liquid.

Fig. 2 is a top plan view of the same.

Fig. 3 is a right end view of the spoon showing the roughened end section for crushing purposes.

Fig. 4 is a side view of a modified form of spoon with the bowl partly in section, and showing in dotted lines how the spoon handle may be employed to remove a "crown" cap from a bottle.

Fig. 5 is a perspective view of the same.

Fig. 6 is a fragmentary side view on a reduced scale of the same, showing in dotted lines the position of a beer can preparatory to the piercing of the top of the can by the cutters on the end of the handle.

Referring now to the drawing in which like reference numerals denote corresponding parts throughout the several views, the numeral 10 indicates the concave bowl part of the spoon which is made integral with one end of a longitudinal rectangular loop-shaped handle 11. The handle 11 comprises a pair of horizontal spaced-apart relatively wide upper and lower flat gripping members 12 and 13, the rear ends of which are connected together by a vertical end piece 14 made substantially thicker than the gripping members 12 and 13. The front end of the lower gripping member 13 is provided with an upwardly and forwardly inclined cross-piece 15 which is integrally connected to the upper member 12 and to the rear end of the spoon bowl 10.

As best shown in Fig. 1, the bowl 10 is raised slightly above the base of the lower gripping member 13 so that when the spoon is placed horizontally upon a flat surface represented by the dot and dash line of Fig. 1, the bowl 10 will be held out of contact with the surface. The relative weight of the handle 11 with respect to the bowl 10 is such that the bowl will be held out of contact with the supporting surface even when said bowl is completely filled with a liquid or solid.

It will also be noted that the upper rim 17 of the bowl 10 will lie slightly below the upper plane of the gripping member 12, as indicated by the dotted line in Fig. 1. Consequently, the bowl 10 will also be maintained out of contact with the supporting table or shelf when the spoon is laid thereon upside down. This feature of the invention will be of particular advantage when the spoon is used in hospitals, sick rooms, or in laboratories, where contamination of the bowl of the spoon must be prevented.

A further advantage of the invention is that when the bowl 10 is filled with medicine, the spoon may be laid upon a tray in the position shown in Fig. 1 before carrying it into the sick room.

The invention will also be found useful in measuring liquors or flavoring extracts for use in mixing drinks, as well as for general cooking purposes.

In order to facilitate the crushing of ice, citrous fruits, etc., which may be contained in a beverage glass or cocktail shaker, the rear end 18 of the handle is provided with a series of rows of staggered pyramid-shaped sharp prongs 19.

In Figs. 4, 5 and 6 a modified form of utility spoon is illustrated,—the spoon being constructed by bending and stamping from flat strip metal stock to form a front bowl 20 and an elongated rear handle 21 terminating in a downwardly extending forked rear end 22. The base of the bowl 20 is provided with a flattened section 23 adapted to rest upon a horizontal surface. In this modified form of the invention, the handle 21 is provided with an intermediate depending tongue member 24 swaged from the metal thereof and formed in the shape of a hook 25 for use in removing crimped or "crown" caps from bottles containing beverages or other liquids,—one such bottle being indicated in dotted outline in Fig. 4.

The handle of this form of spoon may also be employed to open metal cans of beer or other liquids. For this purpose, the forked rear end of the spoon is provided with a pair of diverging sharply beveled edges 26 and 27 terminating in shearing points 28 and 29. By engaging the hook 25 underneath the rim of the can and using said rim as a fulcrum the points 28 and 29 may be forced through the flat top of the can, shearing a pair of apertures therethrough of sufficient size to permit the quick dispensing of the contents of said can when the tool is removed therefrom. In cooperation with the flat base 23 of the bowl 20, the points 28 and 29 serve as feet to support the spoon in non-tipping position.

As clearly shown in Fig. 5, the surface of the depending end 22 of the modified form of spoon has a roughly knurled surface 30 for fruit squeezing and ice crushing purposes.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claim.

Having thus fully described the invention, what is claimed as new and for which it is desired to secure Letters Patent, is:

In a culinary implement having a handle, one end of said handle having an upstanding pointed cutter member, said handle being provided adjacent one end thereof with a fulcrum hook for engaging the rim of a beaded metal can to permit said cutter member to be forced into the end face of said can, said fulcrum hook also serving as a tool for the removal of a crown cap from a bottle, said cutter member being normal to said handle and of sufficient length to hold said implement in substantially horizontal position and also having the function of forming a support for said implement when the latter is resting on a horizontal surface.

THOMAS S. QUEA.